(12) United States Patent
Thaeler et al.

(10) Patent No.: US 8,768,867 B1
(45) Date of Patent: Jul. 1, 2014

(54) CROWD PREDICTION AND ATTENDANCE FORECASTING

(75) Inventors: John Jordan Thaeler, The Woodlands, TX (US); Avkash Piyush Patel, Springdale, AR (US)

(73) Assignee: WhatsBusy, Incorporated, The Woodlands, TX (US)

( * ) Notice: Subject to any disclaimer, the term of this patent is extended or adjusted under 35 U.S.C. 154(b) by 308 days.

(21) Appl. No.: 13/404,802

(22) Filed: Feb. 24, 2012

Related U.S. Application Data (60) Provisional application No. 61/452,062, filed on Mar. 11, 2011.

(51) Int. Cl.
*G06F 15/18* (2006.01)

(52) U.S. Cl.
USPC .......................................................... 706/12

(58) Field of Classification Search
USPC .......................................................... 706/12
See application file for complete search history.

(56) References Cited

U.S. PATENT DOCUMENTS

| | | | | |
|---|---|---|---|---|
| 7,603,308 B2 * | 10/2009 | Gatto | ......................... | 705/36 R |
| 7,676,390 B2 * | 3/2010 | Senturk et al. | ............... | 705/7.11 |
| 7,702,427 B1 * | 4/2010 | Sridhar et al. | .................... | 701/4 |
| 7,970,543 B2 * | 6/2011 | Powell et al. | ..................... | 702/9 |
| 8,073,729 B2 * | 12/2011 | Kisin et al. | ................... | 705/7.35 |
| 8,290,696 B1 * | 10/2012 | Sridhar et al. | ................ | 701/120 |
| 8,600,917 B1 * | 12/2013 | Schimert et al. | ............... | 706/14 |
| 2002/0107720 A1 | 8/2002 | Martin | | |

* cited by examiner

*Primary Examiner* — Michael B Holmes
(74) *Attorney, Agent, or Firm* — Fogarty, L.L.C.; Luiz von Paumgartten (57) ABSTRACT

Systems and methods for crowed prediction and attendance forecasting are described. In some embodiments, a method may include generating an initial attendance forecast for a venue (e.g., a retail store, a restaurant, a bar, a nightclub, a museum, a theater, a stadium, an airport, a hotel, a park, etc.) using a historical attendance prediction model and historical data (e.g., historical point-of-sale data, weather data, geoposition data, satellite image data, or traffic data, etc.). The method may also include creating a dynamic attendance prediction model for the venue based, at least in part, upon the initial attendance forecast and real-time data (e.g., real-time point-of-sale data, utility usage data, employee attendance data, audio or visual equipment usage data, number of detected internet-enabled devices, reservation data, arrivals and departures data, social network data, etc.). The method may further include generating an updated attendance forecast for the venue using the dynamic attendance prediction model.

20 Claims, 8 Drawing Sheets

CROWD PREDICTION AND ATTENDANCE FORECASTING

CROSS-REFERENCE TO RELATED APPLICATIONS

This application claims the benefit of the filing date of U.S. Provisional Patent Application No. 61/452,062 titled "Crowd Predictor, Attendance Forecaster," which was filed on Mar. 11, 2011 and is hereby incorporated by reference herein in its entirety.

TECHNICAL FIELD

This specification is directed, in general, to forecasting and, more particularly, to systems and methods of crowd prediction and attendance forecasting.

BACKGROUND

Attendance is considered one of the most important elements in planning and assessing the viability or success of various types of businesses. In fact, academia and private industry have long experimented with attendance forecasting models, for example, in an attempt to better predict inventories, sales, and to manage operating expenses.

The inventor hereof has recognized, however, that conventional attendance forecasting models have relied on limited types of input data, and have not been scaled across different industries. These models are also not configured to integrate data in real-time to facilitate dynamic evaluations. Moreover, conventional models are not amenable to being exposed such that the public at large—i.e., other than the model's designer (typically the business owner)—may take advantage of attendance forecast information, for instance, to make real-time consumer decisions. In light of these and other concerns, the inventor hereof has developed the various systems and methods of crowd prediction and attendance forecasting described below.

SUMMARY

Embodiments of systems and methods for crowd prediction and attendance forecasting are described herein. In an illustrative, non-limiting embodiment, a method may include generating an initial attendance forecast for a venue using a historical attendance prediction model and historical data, creating a dynamic attendance prediction model for the venue based, at least in part, upon the initial attendance forecast and real-time data, and generating an updated attendance forecast for the venue using the dynamic attendance prediction model. For example, the venue may include a retail store, a restaurant, a bar, a nightclub, a museum, a theater, a stadium, an airport, a hotel, or a park.

In some cases, the historical data may include historical point-of-sale (POS) data originated by the venue: the historical POS data including a plurality of transactions that took place prior to the initial attendance forecast was generated. Additionally or alternatively, the historical data may include external data not originated by the venue, the external data including one or more of: weather data, geo-position data, satellite image data, or automobile traffic data. Meanwhile, the real-time data may include real-time POS data originated by the venue, the real-time POS data related to one or more transactions taking place after the initial attendance forecast is generated.

In some implementations, the method may include receiving the real-time POS data after the venue records each of the one or more transactions. Additionally or alternatively, the method may include receiving the real-time POS data after the venue records a pre-determined number of the one or more transactions. Additionally or alternatively, the method may include receiving the real-time POS data at pre-determined times or time intervals. For example, the real-time data may include one or more of the venue's: utility usage data, employee attendance data, audio or visual equipment usage data, number of detected internet-enabled devices, reservation data, arrivals data, or departures data. The real-time data may also include check-in or status update data gathered from one or more social networks over the Internet.

In another illustrative, non-limiting embodiment, a method may include receiving historical POS data generated by a venue, selecting one of a plurality of historical attendance prediction models, and generating an initial attendance forecast for the venue based, at least in part, upon the historical POS data and the selected historical attendance prediction model. The method may also include receiving updated POS data generated by the venue, creating a dynamic attendance prediction model for the venue based, at least in part, upon the updated POS data and the initial attendance forecast, generating an updated attendance forecast for the venue based, at least in part, upon the dynamic attendance prediction model. For example, the selected one of the plurality of historical attendance prediction models may yield an error based on a comparison between predicted and actual historical attendance data that is smaller than another error yielded by another of the plurality of historical attendance prediction models. To create the dynamic attendance prediction model, the method may include calculating a first set of one or more weights corresponding to the historical POS data and a second set of one or more weights corresponding to the updated POS data.

In some implementations, the method may include receiving additional historical data generated by one or more entities other than the venue, the additional historical data including at least one of: weather data, geo-position data, satellite image data, or automobile traffic data. As such, the method may also include generating the initial attendance forecast for the venue based, at least in part, upon the additional historical data. Additionally or alternatively, the method may include receiving additional data generated by one or more entities other than the venue, the additional data including check-in or status update data gathered from one or more social networks over the Internet. Hence, the method may also include generating the updated attendance forecast for the venue based, at least in part, upon the additional data. Additionally or alternatively, the method may include receiving additional data including at least one of: utility usage data, employee attendance data, audio or visual equipment usage data, number of detected internet-enabled devices, reservation data, arrivals data, or departures data. Accordingly, the method may further include generating the updated attendance forecast for the venue based, at least in part, upon the additional data.

In yet another illustrative, non-limiting embodiment, a method may include providing a venue's historical attendance data to an attendance prediction system remotely located with respect to the computing system, the attendance prediction system configured to generate an initial attendance forecast for the venue using a historical attendance prediction model and the historical attendance data. The method may also include providing the venue's real-time attendance data to the attendance prediction system, the attendance prediction system further configured to create a dynamic attendance prediction model for the venue based, at least in part, upon the initial attendance forecast and the real-time attendance data. The method may further include receiving, from the attendance prediction system, an updated attendance forecast for the venue based on the dynamic attendance prediction model.

In some cases, the historical attendance data may include historical POS data generated by the venue's POS system, the historical POS data corresponding to a plurality of transactions that took place prior to the initial attendance forecast having been generated, and each of the plurality of transactions including a time and an amount. Additionally or alternatively, the real-time attendance data may include real-time POS data generated by the venue's POS system, the real-time POS data corresponding to one or more transactions taking place after the initial attendance forecast is generated, and each of the one or more transactions including a time and an amount. Additionally or alternatively, the real-time attendance data may include one or more of the venue's: utility usage data, employee attendance data, audio or visual equipment usage data, number of detected internet-enabled devices, reservation data, arrivals data, or departures data.

In some embodiments, one or more computer systems or mobile devices may be configured to perform one or more of the methods described herein. In other embodiments, a tangible computer-readable storage medium may have program instructions stored thereon that, upon execution by one or more computers or mobile devices, cause the one or more computer system or mobile devices to perform one or more operations disclosed herein. In yet other embodiments, a system may include at least one processor and a memory coupled to the at least one processor, the memory configured to store program instructions executable by the at least one processor to cause the system to perform one or more operations disclosed herein.

BRIEF DESCRIPTION OF THE DRAWINGS

Reference will now be made to the accompanying drawings, where.

While this specification provides several embodiments and illustrative drawings, a person of ordinary skill in the art will recognize that the present specification is not limited only to the embodiments or drawings described. It should be understood that the drawings and detailed description are not intended to limit the specification to the particular form disclosed, but, on the contrary, the intention is to cover all modifications, equivalents and alternatives falling within the spirit and scope of the claims. Also, any headings used herein are for organizational purposes only and are not intended to limit the scope of the description. As used herein, the word "may" is meant to convey a permissive sense (i.e., meaning "having the potential to"), rather than a mandatory sense (i.e., meaning "must"). Similarly, the words "include," "including," and "includes" mean "including, but not limited to."

DETAILED DESCRIPTION

Embodiments of systems and methods for crowd prediction and attendance forecasting are described herein. As discussed in more detail below, in some embodiments, a method for attendance forecasting may include aggregating historical data from a plurality of sources (e.g., public, private, third party data providers, etc.). The data may then be sorted into a useful format so that modeling may be run from a common denominator of inputs. Suitable algorithms may be screened and selected so that an accurate attendance model, based on the historical data, may be built. Using real-time data collected from various sources, a dynamic model may be layered on top of the historical forecast and output, for example, to web and/or phone user interfaces for real-time decision-making In some cases, historical data aggregated from multiple sources may be organized so that it may be adapted for prediction modeling. The application of the prediction model may be determined so that the appropriate drivers and/or algorithms may be chosen. For example, an attendance forecasting model appropriate for theme parks may use sets of independent historical data such as, for example, temperature, precipitation, gasoline prices, and admission prices. However, these same drivers may not show good correlation when applied to a different type of business. For example, with respect to restaurants, drivers are likely less seasonal and more influenced by ambience, food quality, and reputation. Moreover, a given type of business (e.g., restaurants) may include different sub-types (e.g., Mexican vs. BBQ) for which drivers may be different still (e.g., proximity to Cinco de Mayo vs. Fourth of July). Accordingly, in various embodiments, a prediction model's application may be determined with any suitable level of granularity selected by a user.

Generally speaking, as the drivers differ, an appropriate algorithm may be selected to fit the available data. Once the drivers and algorithm are chosen, an initial model may be built and tested using out-of-sample data. If the model works with the out-of-sample data, then the model can be accepted for further processing. Then, if the model proves to be predictive in a particular situation, outputs may be generated statistically and/or graphically, including multiple types of visual outputs such as bar charts, line charts, tables, etc.

Otherwise, if the model is not predictive, then the analysis may involve a reexamination of the drivers and corresponding data.

Depending upon a particular query desired, a prediction model may output an attendance forecast based upon the historical analytics or incorporate real-time data. Specifically, in some cases, real-time data may be aggregated and integrated into a dynamic model that layers historical forecasts with real-time feedback. The results of the dynamic model may include another set of outputs provided, for example, to web and/or mobile user interfaces. These outputs may again be statistically and/or graphically displayed to a user.

Web and mobile device interfaces may allow the user to determine the type of query they desire. For example, a user may first determine the intended application for the query (e.g., a theme park, a restaurant, a bar or nightclub, etc.). The web and mobile device interfaces may target the related data and model for the forecast. The user may then determine the forecast they desire—for example, a specific date in a given month, week, or even real-time. Given the application and the desired forecast, the user interface inputs may pull the matching data from the forecasting model and include the dynamic model outputs if so desired. The resulting attendance forecast or crowd prediction information may then be presented.

In various embodiments, systems and methods described herein may be scalable across multiple business types and multiple business lines. Particularly, crowd prediction and attendance forecasting models discussed below may be adapted to a wide range of businesses, including: airplanes, airports, amusement parks, rental properties, beaches, public transport and traffic in general, classrooms or buildings, nightclubs and bars, concerts, conventions, cruise ships, emergency rooms, fine art events, hotels, movies, museums, parking garages, national, state and local parks, golf courses, recreation centers, restaurants, shopping, ski resorts, sporting events, wineries and vineyards, and zoo and aquariums.

Input data used to create these models may originate from direct or indirect measurements, from the proprietor of a business or venue, from a data service provider, third-party sources, etc. When the data is acquired it may be screened to common denominators so that it may be suitable for statistical analysis, and then it may be aggregated. In some cases, the systems and methods described herein may be configured to collect and store large databases of data across multiple business lines. In addition, advanced statistical modeling may be used that accounts for multiple independent variables that affect crowd and attendance figures. Independent variables may be correlated against the dependent data to draw advanced predictive analytics. The independent drivers of attendance may vary across market applications. Statistical and graphical output may be used to evaluate the independent drivers. Smoothing and normalization techniques may be incorporated to identify the best (or better) distribution model(s). In some cases, the systems and methods described herein may be configured to store, and query, multiple models across different lines of business.

In some embodiments, techniques described herein may aggregate historical attendance data and apply statistical calculations to find trends between historical attendance figures and independent drivers of attendance. Examples may build upon the aforementioned historical technique by dynamically collecting and modeling real-time data in combination with historical analytics. The real-time data may be received from a multitude of sources, including: radio-frequency identification (RFID) devices, global positioning systems (GPS), Wi-Fi and cell tower triangulation, social network postings, user provided data, and public data sets.

Moreover, web and mobile device interfaces may present modeling outputs to different types of users. Specifically, unlike with conventional forecast models, systems and methods described herein may allow the user to be anyone interested in the modeling results (e.g., the public at large). For example, a business may be interested in forecasting attendance in one day, one week, and one month from the time of the query, whereas a consumer may only be interested in a real-time attendance forecast, such as the wait time for a restaurant. In some cases, a user may be either a human end user, or another machine process that may access the analytics and statistical functions described herein. Accordingly, techniques described herein may enable appropriate presentation modeling results corresponding to each different type of user.

Figure 1:
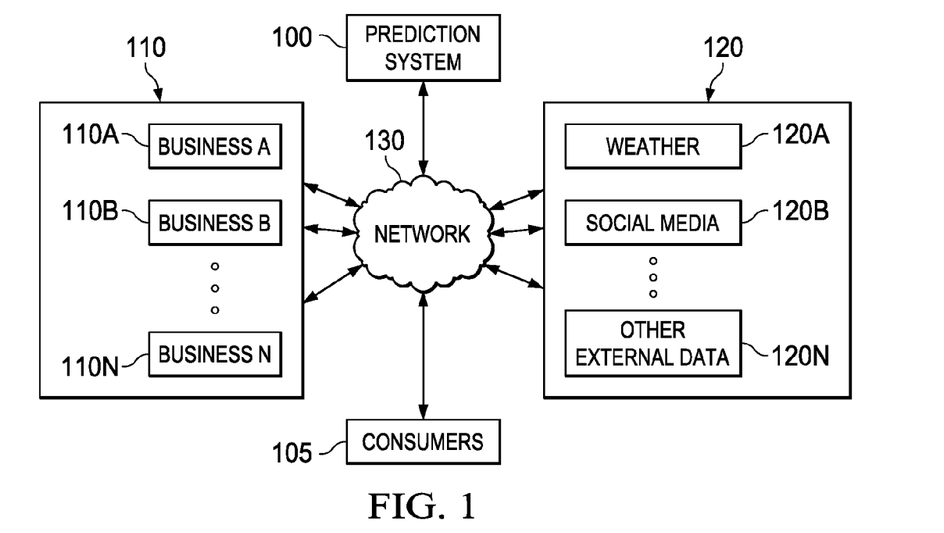
FIG. 1 is a block diagram of a prediction or forecasting environment according to some embodiments.

Turning now to FIG. 1, a block diagram of a prediction or forecasting environment is shown according to some embodiments. As illustrated, attendance prediction system 100 may be coupled to consumer devices 105, businesses or venues 110A-N, and external data sources 120A-N through network 130. Network 130 may include any suitable wired or wireless/mobile computer or data network including, for example, the Internet, or third generation (3G), fourth generation (4G), or Long-Term Evolution (LTE) wireless networks. Prediction system 100 may include a server or computer system configured to execute the software shown in FIG. 2, and to communicate with consumers 105, businesses 110, and/or external data sources 120 in order to perform one or more crowd prediction and attendance forecasting operations, for example, as described in connection with FIGS. 3-9, 11, and 12.

Businesses or venues 110 may include any type of business such as, for example, retail stores, restaurants, bars, nightclubs, museums, theaters, stadiums, airports, hotels, parks, etc. Generally speaking, each of venues 110A-N may include a point-of-sale (POS) system and/or computer system configurable to provide and receive data from prediction system 100 over network 130. In some cases, POS data and/or other actual attendance (e.g., ticket scanners or counters, guest counters, etc.) data may be provided to prediction system 100 in real-time. For example, prediction system 100 may receive real-time POS after a given venue records each transaction, after the venue records a pre-determined number of the one or more transactions (e.g., every 5 or 10 transactions), and/or at pre-determined times (e.g., at the top of the hour) or time intervals (e.g., every 15 minutes).

External data sources 120A-N may also include a computer or server configured to provide data to prediction system 100. For example, depending on the type of models and algorithms used, external data may include, but is not limited to: weather conditions, presidential approval ratings, gas prices, stock market prices, volatility indexes, commodity prices, local, regional, state and national event calendars, scheduling and popularity of TV programs, consumer price index, unemployment, gross domestic product, inflation, average income for specific geographies, demographic information for specific geographies, sporting events, social popularity of people and places, media releases and popularity of said media, geo-political sentiments, state, national and international holidays, seasonality, traffic patterns, social media data (e.g., "check-ins," "status updates," or the like), etc.

Consumers 105 may operate any number of computing devices include, but not limited to, desktops, laptops, tablets, smart phones, etc. Generally speaking consumer devices 105 may allow users to carry out voice communications, navigate the Internet or other data networks using a web browser application or the like via a Graphical User Interface (GUI), etc. As such, consumers 105 may operate devices capable of accessing prediction system 100 to obtain information about attendance forecasting with respect to businesses or venues 110. Moreover, in some cases, each such device may be configured with GPS hardware, wireless Internet connectivity (e.g., over Wi-Fi, WiMax, 3G, 4G, LTE, etc.), RFID transceivers, near-field communication (NFC) chips, and/or other similar capabilities. Accordingly, in some cases, consumer devices 105 may also provide input data (directly to prediction system 100 or indirectly through external data sources 120, for example) that may be used in creating prediction models for businesses 110.

Protocols used to enable communications taking place in FIG. 1 may be selected, for instance, based upon the type of content being communicated, the type of network 130, and/or the capabilities of devices 105-120. Examples of types of protocols that may be used include, but are not limited to, HyperText Transfer Protocol (HTTP), Real Time Messaging Protocol (RTMP), and Real-time Transport Protocol (RTP), etc.

Figure 2:
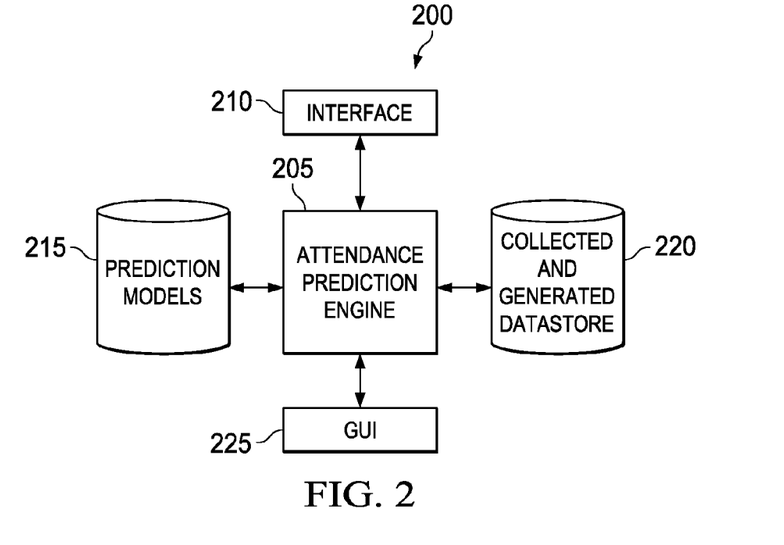
FIG. 2 is a block diagram of an attendance prediction software according to some embodiments.

FIG. 2 is a block diagram of attendance prediction software 200. In some embodiments, attendance prediction software 200 may be a software application executable by prediction system 100 of FIG. 1. In operation, a plurality of communication sessions or data streams may be transmitted across network 130 between devices 100 and 105-120. Such communications may be streamed over HTTP, RTMP, RTP, or any other suitable protocol(s). As such, network interface module 210 may be configured to transmit and capture data packets to and from network 130, respectively.

Attendance prediction engine 205 may be configured to perform one or more operations described in connection with FIGS. 3-9, 11, and 12 below. To that end, prediction engine 205 may exchange data with prediction model database 215 and collected & generated datastore 220. For example, prediction model database 215 may include one or more attendance forecast models based on historical and/or real-time data for one or more different types of businesses or venues. Meanwhile, collected & generated datastore may include data gathered from consumers 105, businesses or venues 110, and/or external sources 120, as well as data generated during the creation of one or more models stored in database 215.

In various embodiments, databases 210 and/or 215 may include any suitable type of application and/or data structure that may be configured as persistent data repositories. For example, databases 210 and/or 215 may be configured as relational databases that include one or more tables of columns and rows and that may be searched or queried according to a query language, such as a version of Structured Query Language (SQL). Alternatively, databases 210 and/or 215 may be configured as structured data stores that include data records formatted according to a markup language, such as a version of eXtensible Markup Language (XML). In some embodiments, databases 210 and/or 215 may be implemented using one or more arbitrarily or minimally structured data files managed and accessible through a suitable program. Further, databases 210 and/or 215 may include a database management system (DBMS) configured to manage the creation, maintenance, and use of databases 210 and/or 215.

In some implementations, Graphical User Interface (GUI) module 225 may be configured to support interactions between attendance prediction engine 205 and a prediction model designer operating prediction system 100, for example. GUI module 225 may also generate user interfaces (or elements thereof) for businesses 110 and consumers 105. In that regard, GUI module 225 may be implemented using any suitable techniques for deploying web-based content and applications, such as, for example, Hypertext Markup Language (HTML), Common Gateway Interface (CGI), JAVASCRIPT®, PHP, PERL®, C/C++, or any suitable combination of these or other commercial, open source and/or proprietary languages, frameworks or development environments for generating and distributing web-based information. Examples of such interfaces are described in connection with FIGS. 10, 13, and 14.

In various embodiments, the modules shown in FIG. 2 may represent sets of software routines, logic functions, and/or data structures that are configured to perform specified operations. Although these modules are shown as distinct logical blocks, in other embodiments at least some of the operations performed by these modules may be combined in to fewer blocks. Conversely, any given one of modules 205-225 may be implemented such that its operations are divided among two or more logical blocks. Moreover, although shown with a particular configuration, in other embodiments these various modules may be rearranged in other suitable ways.

Figure 3:
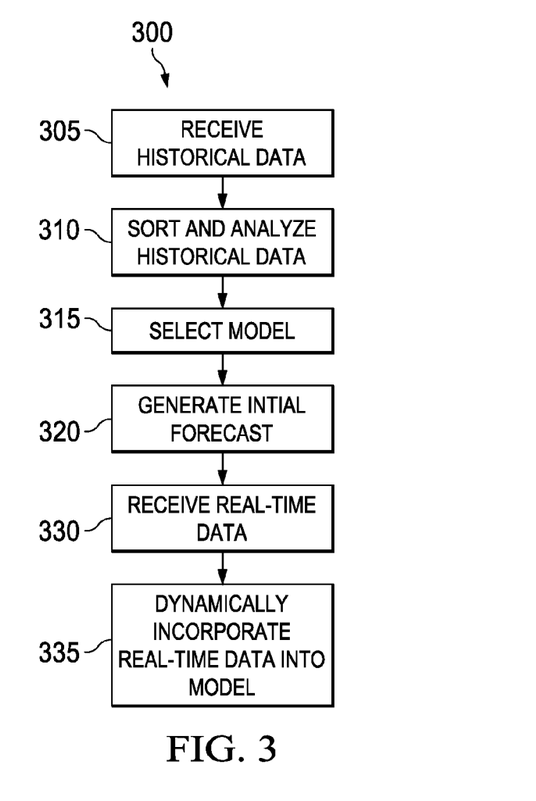
FIG. 3 is a flowchart of an attendance prediction method according to some embodiments.

FIG. 3 is a flowchart of an attendance prediction method. In some embodiments, method 300 may be performed, at least in part, by attendance prediction software 200 executed by prediction system 100. Historical data may be aggregated and received 305 from a multitude of sources, including but not limited to: numerous venues 110, external data sources 120, and consumers 105. The data may then be sorted into a useful and relevant format 310 for the prediction in question. For example, data may be sorted differently for a prediction for Venue 110A than it would for Venue 110B. For sake of illustration, such sorting may result, for example, upon a two column table with the time of an observation in the first column and the value of the observation in the second, or a twenty-four column table where each row refers to a date, each column refers to an hour within that date, and each value is an aggregate of the data over that date and hour.

Appropriate algorithms may be screened and selected 315 so that an accurate, initial attendance model, based on the historical data, may be generated. In some implementations, initial attendance models may be selected based upon how well they minimize the sum-of-squares errors when predictions are compared to observed venue data, as well as their complexity (more complex models are penalized). As a result, method 300 may generate historical forecast 320. Generally speaking, such an initial forecast may include a vector of predictions and/or a mathematical function (together with estimates for all relevant parameters) for generating predictions.

Using real-time data 330 that has been collected and received from various sources 105-120, a dynamic model 335 may be layered on top of the historical forecast, where the initial forecast is replaced with a model that computes both historical and real-time data. Real-time data may include, but is not limited to, updated attendance indices from the venue, updated attendance indices for neighboring venues, cellular GPS data, and traffic data.

Figure 4:
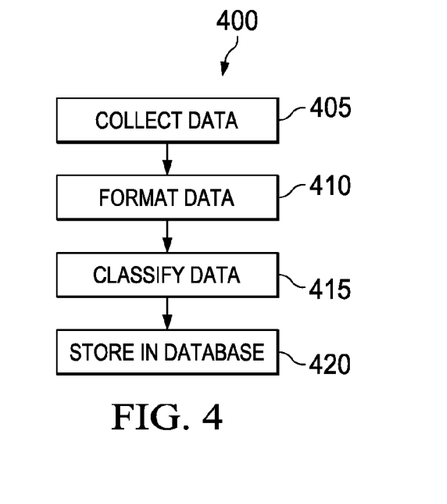
FIG. 4 is a flowchart of a method of sorting and analyzing incoming data according to some embodiments.

FIG. 4 is a flowchart of a method of sorting and analyzing incoming data. In some embodiments, method 400 may be performed, at least in part, by attendance prediction software 200 executed by prediction system 100. Historical data may be collected 405 from multiple sources, including, but not limited to, a business itself (e.g., 110A, 110B, etc.) and/or external sources 105 or 120. Historical business data may include, for instance, past transaction data that resides on a business's computer or point-of-sale (POS) system. For example, transaction data may have fields such as time, item sold, price, and other characteristics.

More generally, data may be collected from businesses, purchased, downloaded from data repositories on the Internet, parsed from web pages using scripts, and/or queried via free or commercial Application Programmable Interfaces (APIs). In some implementations, the data may arrive from many sources, and thus formatting 410 may adequately handle HTML Markup, MICROSOFT EXCEL®, comma-separated values (CSV), and/or other formats. For sake of illustration, the data may in some cases be formatted into a two-column table, where the first column refers to the time of the observation and the second column refers to the value of the observation at that time.

Once data has been shaped into the chosen format it may be classified according to source, type, and end-use 415. It may then be labeled appropriately and filed in into a database 420 fitting the proper schema. Such a schema may typically match the previous format, with added columns identifying the type and source of the data, as well as a hash value to uniquely identify batch uploads for error-checking purposes.

Figure 5:
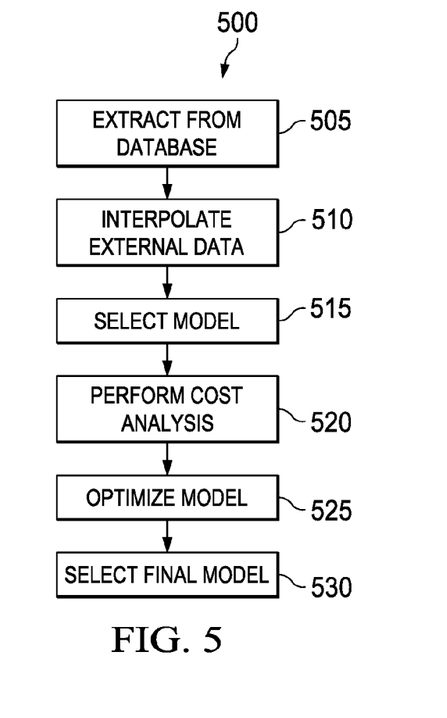
FIG. 5 is a flowchart of a method of selecting analytical models according to some embodiments.

FIG. 5 is a flowchart of the method of selecting analytical models. In some embodiments, method 500 may be performed, at least in part, by attendance prediction software 200 executed by prediction system 100. Venue and external data may be separately extracted from database 220 at block 505. Venue data may include data that came directly from the business for which the forecast is created, whereas external data may influence a forecast, but is not originated by the business itself. As an example, venue data may include business data from a POS system containing time, price and item fields, and external data may include other data, such as weather, that may be independent from the business but nonetheless may have an impact on attendance predictions.

Not all external data may be published in a timely fashion, so when gaps in data exist, missing values may be interpolated 510. For example, if weather data were published daily and hourly data were needed, interpolation would generate reasonable data for the hours of missing values. Based upon the type of venue, a model is applied to the recombined venue and external data 515. Empirical evidence has shown that certain models may be prioritized for such industries, and thus time is saved by not testing the data sets with all available models. For example, certain models may derive more accurate forecasts for restaurants where other models may perform better for predicting attendance at museums. Based on such an analysis, the use of a prediction model well suited for a museum-type establishment on a restaurant may be bypassed.

Resulting models may be evaluated using machine learning cost functions 520, quantifying the accuracy of models as a function of external variables. Generally speaking, the goal of the evaluation is to increase or optimize accuracy while reducing or minimizing the number of external factors. In this specific instance, if the goal of the model is to predict the amount of future foot traffic to a business with the highest degree of accuracy and confidence, for example, the cost analysis may reject models that produced forecasts of low accuracy, or those that produced high accuracy but included many more variables than models with similar accuracy but fewer variables. Once optimization has been achieved 525, this final model is selected for future analysis of similar data patterns 530. In some implementations, optimization may be handled and achieved by minimizing the sum of squares errors of the predictions, where models penalized for their complexity. For instance, the Nelder-Mead Downhill Simplex is used for optimization, although other techniques may be used as appropriate. Models may then be recorded and used as a starting point when analyzing similar venues.

In various embodiments, a goal-seeking or optimization process may or may not always guarantee convergence to an absolute solution. For example, an optimization process may exhaustively evaluate a solution space to ensure that the identified solution is the best available. Alternatively, an optimization process may employ heuristic or probabilistic techniques that provide a bounded confidence interval or other measure of the quality of a solution. For example, an optimization process may be designed to produce a solution that is within at least some percentage of an optimal solution, to produce a solution that has some bounded probability of being the optimal solution, or any suitable combination of these or other techniques.

Figure 6:
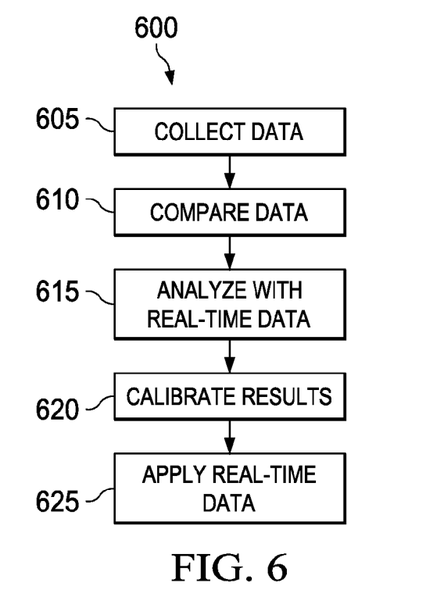
FIG. 6 is a flowchart of a method of incorporating real-time data into an initial model according to some embodiments.

FIG. 6 is a flowchart of a method of incorporating real-time data into an initial model. In some embodiments, method 600 may be performed, at least in part, by attendance prediction software 200 executed by prediction system 100. Historical prediction data 605 and historical actual data may be collected (e.g., from database 220) for analysis. Historical prediction data includes predictions that were given for a past period of time. For example, if the date were Jan. 1, 2010, the system would provide a prediction for foot traffic for the date Jan. 2, 2010, which would be a date in the future. On Jan. 3, 2010, the prediction for Jan. 2, 2010 would be a historical prediction. Historical actuals would be actual foot traffic through the business on Jan. 2, 2010.

The two data sets may be compared and differences determined 610. For example, a subtraction between historical actuals and historical predictions may yield the disparity in question. The disparity may then be further analyzed with archived real-time data 615, which may be a biased data set not originating from the same source as that of the historical actuals. Again, real-time data may be collected, for example, through Application Programmable Interfaces, delivered comma separate values, Internet scraping, automatic processing, audio and video feed reprocessing and recombinatorics, and manual entry.

For example, historical real-time data may include geolocation coordinates for mobile devices in a defined venue area, whereas historical actuals are data from the venue's Point of Sale (POS) system. In this sense, the data from the mobile device geolocates is not biased by the POS data, and thus provides an objective reference for real-time data. Other sources of real-time data may be, but are not limited to: fire code compliance checks, social network data—including "check-ins" and "status updates," feed processing from audio or visual equipment, satellite images, automobile or traffic data, utility usage, emergency responder reports, real-time transaction data from neighboring and related businesses, geopositioning from vehicles, third party reviews, departures and arrivals for transportation, enumeration of detected Internet-enabled devices (e.g., using a venue's wireless access point), counts or estimates from neighboring or related businesses, monitoring of promotional and advertising updates, appointment adjustments, and employee attendance changes.

These results are then calibrated for accuracy 620. Calibration determines how much credibility is given to the historical prediction model and how much credibility is given to the real-time update stream, and how these two predictions are weighted when they are averaged to generate the final prediction. The result of the calibration is a historical prediction model that is ready for real-time updating. Once current real-time data has been applied 625, the prediction model becomes dynamic, accounting for instantaneous changes in real-time data, delivering updated predictions without further manual input.

For a sample equation, consider the following representation for the dynamic modeling of real-time information:

$$p(\lambda|k) = \frac{\frac{\lambda^k e^{-\lambda}}{k!}}{\sum_m \frac{\lambda_m^k e^{-\lambda}m}{k!} p(\lambda_m)} p(\lambda)$$

As shown in Equation 1, the probability that the expected attendance is lambda given the real-time variable takes value k is equal to the probability that we observe k given lambda (Poisson distribution) divided by the unconditional probability that the expected attendance is lambda, where m an index integer.

Figure 7:
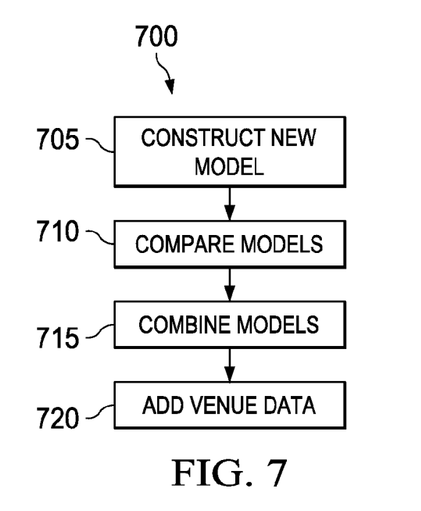
FIG. 7 is a flowchart of a method of self-learning according to some embodiments.

FIG. 7 is a flowchart of a method of self-learning. In some embodiments, method 700 may be performed at least in part by attendance prediction software 200 executed by prediction system 100. Particularly, in some implementations, prediction models for venues or businesses 110 may be stored so new models need not be built for every new venue entered into platform 100. If there is no existing model that is entirely relevant for a new business, a new model may be constructed 705. However, it is frequent that components of existing models are relevant for new venues, therefore a comparison may be performed 710 to determine similarities between the new venue data and old models. If no components of existing models can be found to fit the new data set, then the new model will be constructed in totality. If there are similar components, then those similar components may be applied to the new model via model combination 715. Moreover, new venue data is then added to the model 720 using Bayesian analysis to construct the machine-learning model.

As such, when a new venue is to be predicted it is compared to already understood venues and their similarities are assessed. Models for similar venues may be combined (according to the ways they are similar) to predict attendance for the new venue. As data for the new venue comes in, Bayesian analysis may again be used to update the predictions.

Figure 8:
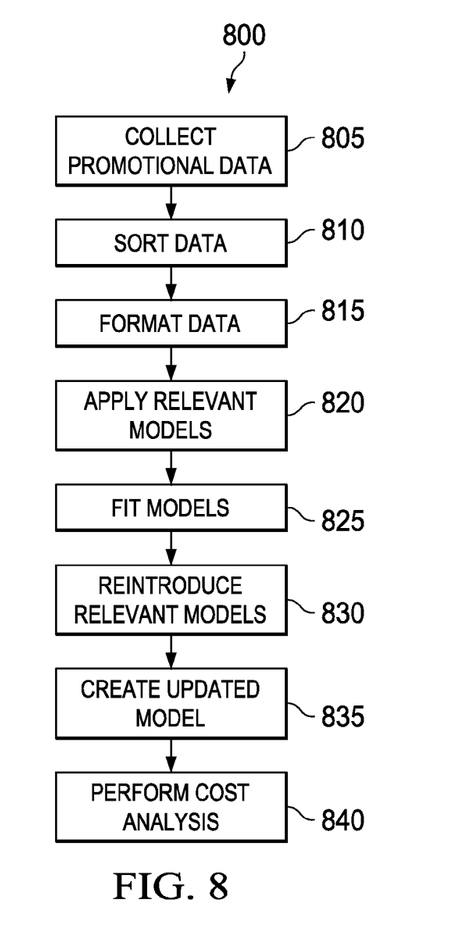
FIG. 8 is a flowchart of a method of determining the effect of promotions on attendance predictions according to some embodiments.

FIG. 8 is a flowchart of a method of determining the effect of promotions on attendance predictions. In some embodiments, method 800 may be performed, at least in part, by attendance prediction software 200 executed by prediction system 100. All promotions are not the same, and thus this method highlights how different types of promotions may be handled by system 100. Specifically, promotional information may be provided by a business 110 and collected 805. Such promotional information may be sorted by given and missing data properties 810. The promotional data may be formatted 815 so that it can be accurately typed and relevant models chosen 820. Acceptable formats include, but are not limited to, lists of IDs for transaction which use a promotional voucher or deal, tables of marketing vectors with the funding used on each vector, and/or tables of time stamps when individual commercials ran and the cost of the commercial.

If promotional start date, end date and cost are provided, an ADSR (Attack, Decay, Sustain, Release) or lagged ADSR model may be employed. This modeling allows for quick determination of promotional efficacy, as expected outcomes—both over and under—for scenarios without the promotion can be measured. For example, if a business were to list the start date and end date for a select happy hour, and the price reduction for drinks was disclosed, ADSR modeling would be used to tell the business the impact of the promotion from the status quo. If the promotion had not been run, the model would detail what the business could have expected.

For promotions where direct measurement of efficacy is made and reported, a time decay (Poisson arrival process) may be used to interpolate the results after passing through the sorting process. Specifically, non-homogenous or Cox/doubly stochastic modeling may be employed to elicit the result. A direct measurement may include the issuance of online coupons that customers would need to print and submit for redemption. This data is readily available, such as storage on Point of Sale (POS) systems, and easily extractable for analysis. The direct measurements also surface other data of value, such as comparison of transactions with redeemed promotions to those transactions without to determine the effect on spending habits.

In cases where rich data is provided by the venue, the data may be broken down into a table with rows for each relevant date/time, columns for each marketing type, and for each item the best estimate of the cost of that marketing type on that day is determined. This may include, for example, a breakdown of how different marketing vectors were funded or a list of the times that radio commercials were run. For example, for a radio advertisement that ran on the 20th of December and cost $500, the data may be transformed to isolate the impact of each item individually, then used to update the predictions.

A model is then fit to the formatted data set 825. Bayesian machine learning techniques may be used to identify the components of attendance, which are 1) determined by non-promotional factors, 2) unexplained noise, or 3) caused by the promotion. The initial model is then reintroduced 830 to remove redundancies and an updated model is created 835. A cost analysis may be performed 840 to maximize performance of the learned model.

Figure 9:
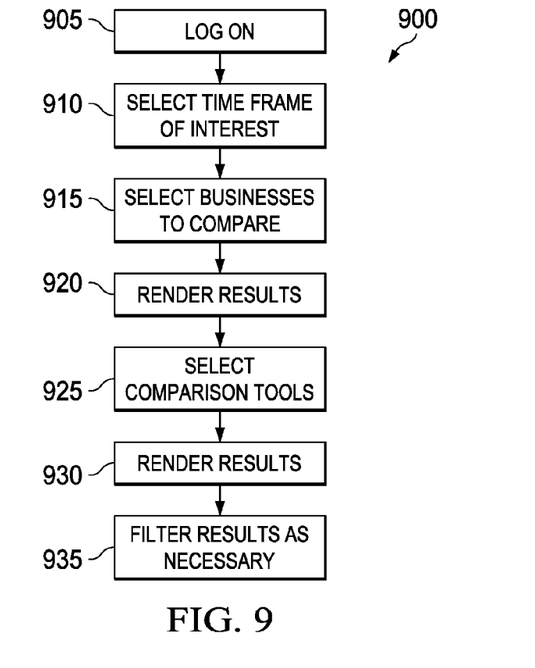
FIG. 9 is a flowchart of a method of comparing attendance predictions for different businesses according to some embodiments.

FIG. 9 is a flowchart of a method of comparing attendance predictions for different businesses. In some embodiments, method 900 may be performed, at least in part, by software executed by a computer system operated by a business user (e.g., associated with one of venues 110A-N). After logging onto prediction system 100 (e.g., by entering a username and password), the business user may then select their time frame of interest to run a comparison 910. For example, a business user may wish to compare attendance predictions for different businesses or venues over a few hours, a few days, or a few weeks of time. The beginning and end dates—and times—may defined such that prediction system can query the right amount of data to render a useful result. The business user may choose which other venues they want to compare 915 over the time frame they have chosen. Business users may choose singular businesses or groups of businesses to compare. Results are then graphically rendered for the business user's viewing 920, for example, with time on the x-axis and other values on the y-axis.

The business user may then choose what type of comparison tools to use 925. For example, a business may compare itself to other businesses or it may compare other businesses to other businesses. Further, the business user may change the common denominator of comparisons, thus comparing attendance predictions, actual attendance, or any combination thereof. As an example, the business user may wish to compare the forecasted foot traffic for a geographically neighboring business to its own forecasted foot traffic.

Figure 10:
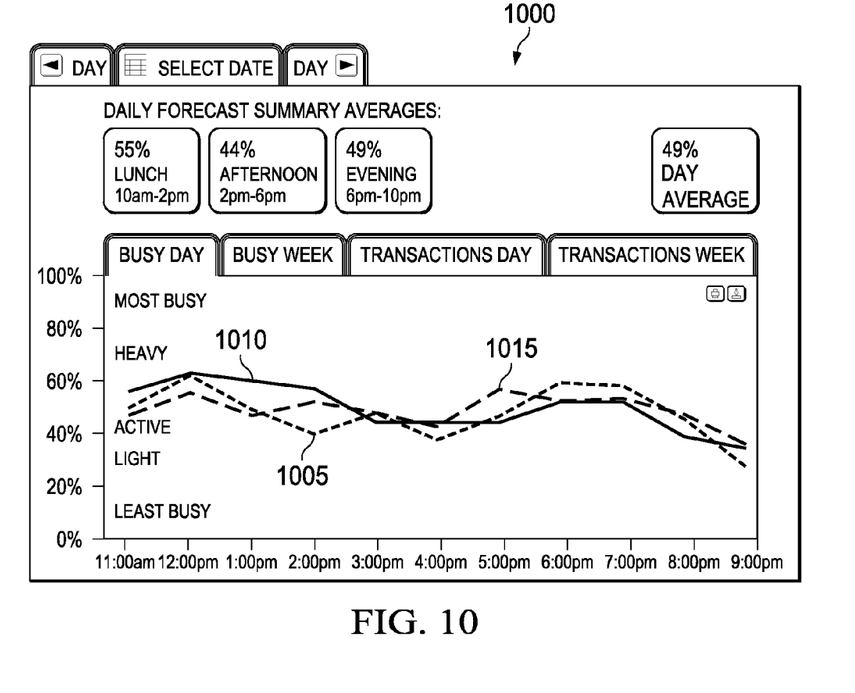
FIG. 10 is a screenshot of a graphical interface presented to a business user according to some embodiments.

The results are rendered 930 and the business user may then filter any results that are not relevant to their decision-making. For example, the business user may have initially selected a business or venue in 915 that it thought would be relevant for a comparison, but after performing certain operations it may learn that the business or venue it selected is not relevant. Perhaps the business user was trying to determine if future foot traffic at another business(es) had any impact on his own business, and after comparisons he learned that the other business(es) did not have any influence. At this point, the business user may filter any such results 935 to arrive at the appropriate set of data for decision-making FIG. 10 is a screenshot of a graphical interface presented to a business user. In some embodiments, screenshot 1000 may be displayed by a computer system operated by a business user (e.g., associated with one of venues 110A-N). As shown, screenshot 1000 illustrates a non-limiting way in which business users can view their attendance forecast and their actual historical data overlapped on the same viewing pane to make decisions. In this case, curve 1005 shows predicted attendance for a given day, curve 1010 shows attendance for the same day in the previous week, and curve 1015 shows attendance for the same day in the previous year. The user may add or remove curves based on customization inputs in other fields in the viewing pane. Graphical tabs may also allow the business user to visualize similar curves for an entire week's time and other windows of time depending on the business user's preferences. Additionally or alternatively, the business user may also visualize curves depicting predicted and historical transactions for selected periods of time (e.g., day and week).

Screenshot 1000 may also show daily or weekly forecast summary averages (e.g., for particular time periods, which may be selected by the user or determined by the prediction model used, as well as an overall average). These summaries may be customizable to deliver suggestions as they relate to staffing, inventory, promotions, or other critical business operations. In addition, such an interface may show how a business can compare itself to other businesses, and how prediction system 100 quantifies the differences based upon the comparison tools the business chooses to use. In some cases, a business interface may show the business's location, statistical and graphical outputs of the attendance forecast period, and a list of current marketing deals being focused through the interface. The interface may also make suggestions to the business user that may improve operating conditions based upon the attendance forecast. A query function may be included to forecast the attendance for various time periods and the graphical and statistical outputs may change accordingly. Also, the business interface may show social network feedback in real-time or near real-time.

Figure 11:
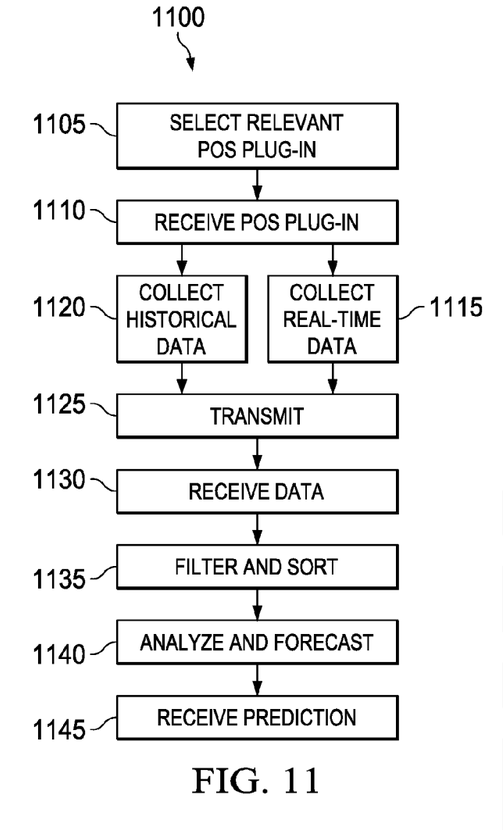
FIG. 11 is a flowchart of an attendance prediction method from a business' perspective according to some embodiments.

FIG. 11 is a flowchart of an attendance prediction method from a business's perspective. Similarly as above, in some embodiments method 1100 may be performed, at least in part, by software executed by a computer system operated by a business user (e.g., associated with one of venues 110A-N). After a business user logs onto prediction system 100 (e.g., through user interface 225), the user may choose a particular type of POS system that his or her venue currently operates 1105. In the hospitality space, for example, POS systems may include MICROS®, RADIANT®, DINERWARE®, etc. This selection may in turn ensure delivery of a properly designed POS plug-in to the business's computer system. POS plug-ins may differ, for example, based on POS manufacturer and/or version or model number. After the proper selection has been made, the business may receive the proper POS plug-in 1110 over network 130, after which it may self-install on the POS operating system, for instance.

The POS plug-in establishes connectivity with the business's POS system, collecting and transmitting historical and real-time data 1115, 1120, 1125 from the POS back to prediction system 100. Prediction system 100 receives and sorts the data 1130, 1135 according to the type of business that is transmitting the data. For sake of illustration, an example of sorting may be a four-column table where the first column states the time of the observation, the second column states the number of transactions between the stated time and one hour later, the third column states the gross revenue over the same period, and the fourth column contains specific properties for the items that were logged as purchased in the POS. Other data may be collected and used immediately, or stored and used for future operations.

The data may be analyzed and a forecast may be then generated and delivered to the business 1140, 1145 for display via their user interface. In some implementations, attendance prediction may be constantly updated based upon the stream of real-time data that is fed into back into prediction system 100 according to 1115 and 1125. For example, a forecast may be updated during pre-arranged times, whenever new data arrives, a set amount of time since the last update, or some combination of the preceding.

Figure 12:
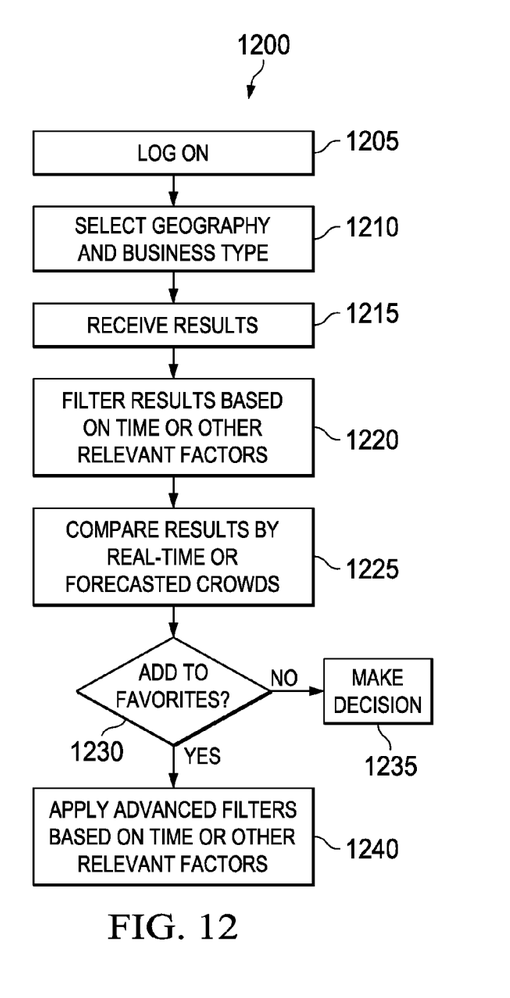
FIG. 12 is a flowchart of an attendance prediction method from a consumer's perspective according to some embodiments.

FIG. 12 is a flowchart of an attendance prediction method from a consumer's perspective. In some embodiments, method 1200 may be performed, at least in part, by software executed by a computer system or mobile device operated by a consumer (e.g., 105). The consumer logs on to prediction system 100 from a user interface 1205 and then selects the geography and business type of interest 1210. For example, such a selection may involve a user's search for restaurants in Los Angeles, Calif. The results are then populated on the consumer's user interface 1215.

The consumer may then filter the results rendered by the time of interest 1220 or other relevant filter. Keeping the same example in mind, assume that the consumer only wishes to view attendance predictions for restaurants in Los Angeles, Calif. for a select time window—e.g., "this evening." In some implementations, the consumer may input starting and ending times for the query. A consumer may also search for a forecasted time later in the week 1225, for example. If the consumer uses a different filter, such as crowd-sourced rating, for instance, the consumer may input a range for the filter, such as three to five stars, if searching by a star rating.

At this juncture the consumer may either add the rendered results to a favorites list or make his decision 1230. A favorites list may store the result for easy access at a later time. If the results are not added to his favorites list, the consumer may quickly make a decision 1235. If the results are added to his favorites list, then further filters may be applied, such as, for example, those of proximity to areas of interest.

Figure 13:
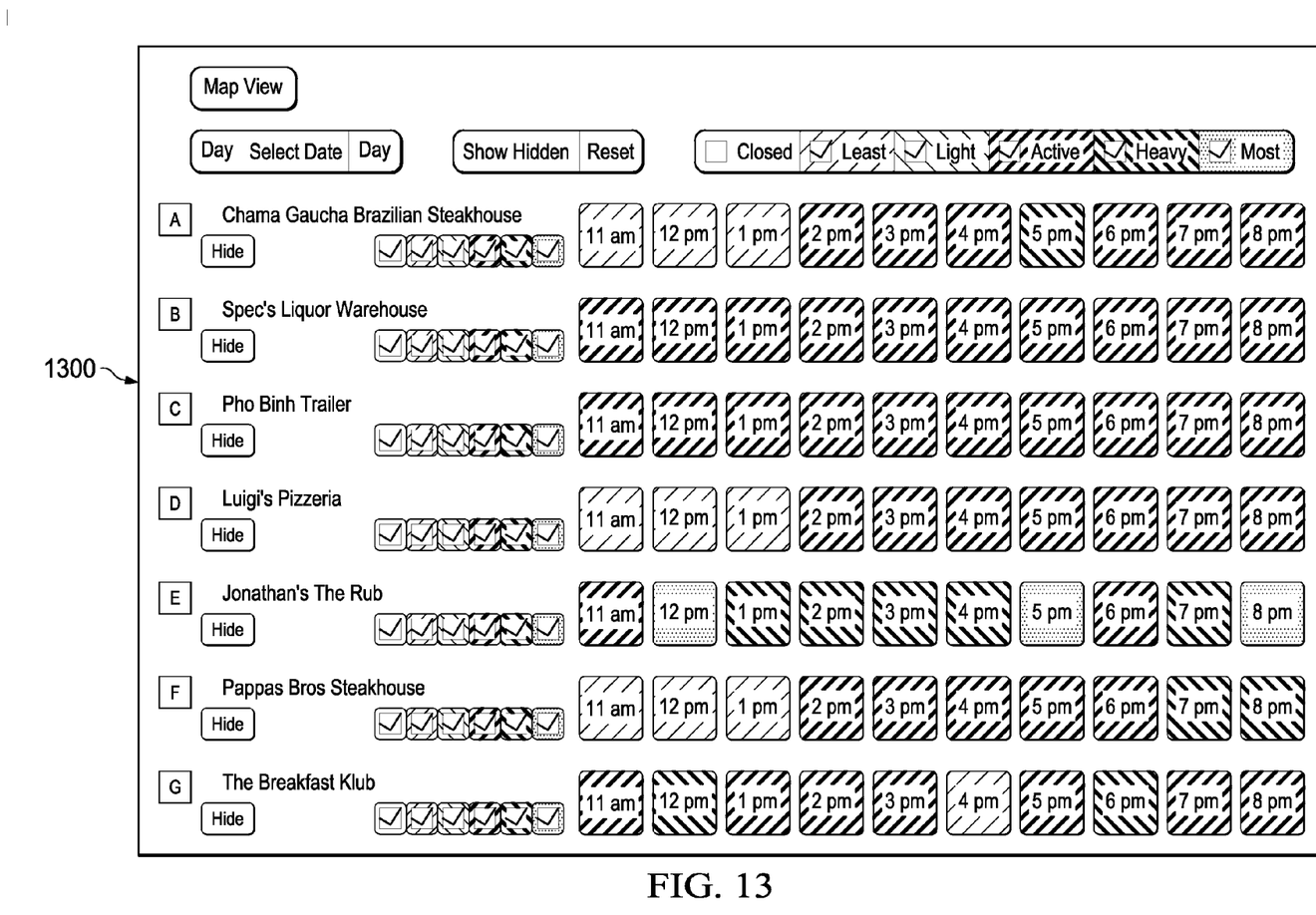
FIG. 13 is a screenshot of graphical interface presented to a consumer according to some embodiments.

FIG. 13 is a screenshot of graphical interface presented to a consumer. In some embodiments, screenshot 1300 may be displayed by a computer system operated by a consumer (e.g., 105). In this illustration, screenshot 1300 may include a list of businesses or venues A-G selected by the consumer. Each venue may be associated with a timeline (e.g., hourly) that encodes attendance predictions for that venue. For example, attendance predictions may be provided in terms of volume of foot traffic classified as "least," "light," "active," "heavy," and "most." Each timeline may also indicate times or days when a particular venue is closed. A "hide" control may allow a consumer to remove venues from the list, and a "show hidden" control may allow the consumer to bring those venues back. In some implementations, the consumer interface may also overlay summary date on a geographical or street map.

In some implementations, while a consumer interface may not contain the raw data that the attendance modeling was based upon, it may nonetheless contain the predictive analysis of the model and may be able to query forecasts for a specified time period. Again, the attendance query can be broken down into varying time segments and may contain graphical and statistical outputs for the attendance forecast based upon the queried time period. Information about a given establishment may be posted on the interface along with real-time information from social networks. Marketing incentives may also be displayed with an ability to claim the incentive. Further, such an interface may also allow for consumer provided data via check-in or status update features.

Figure 14:
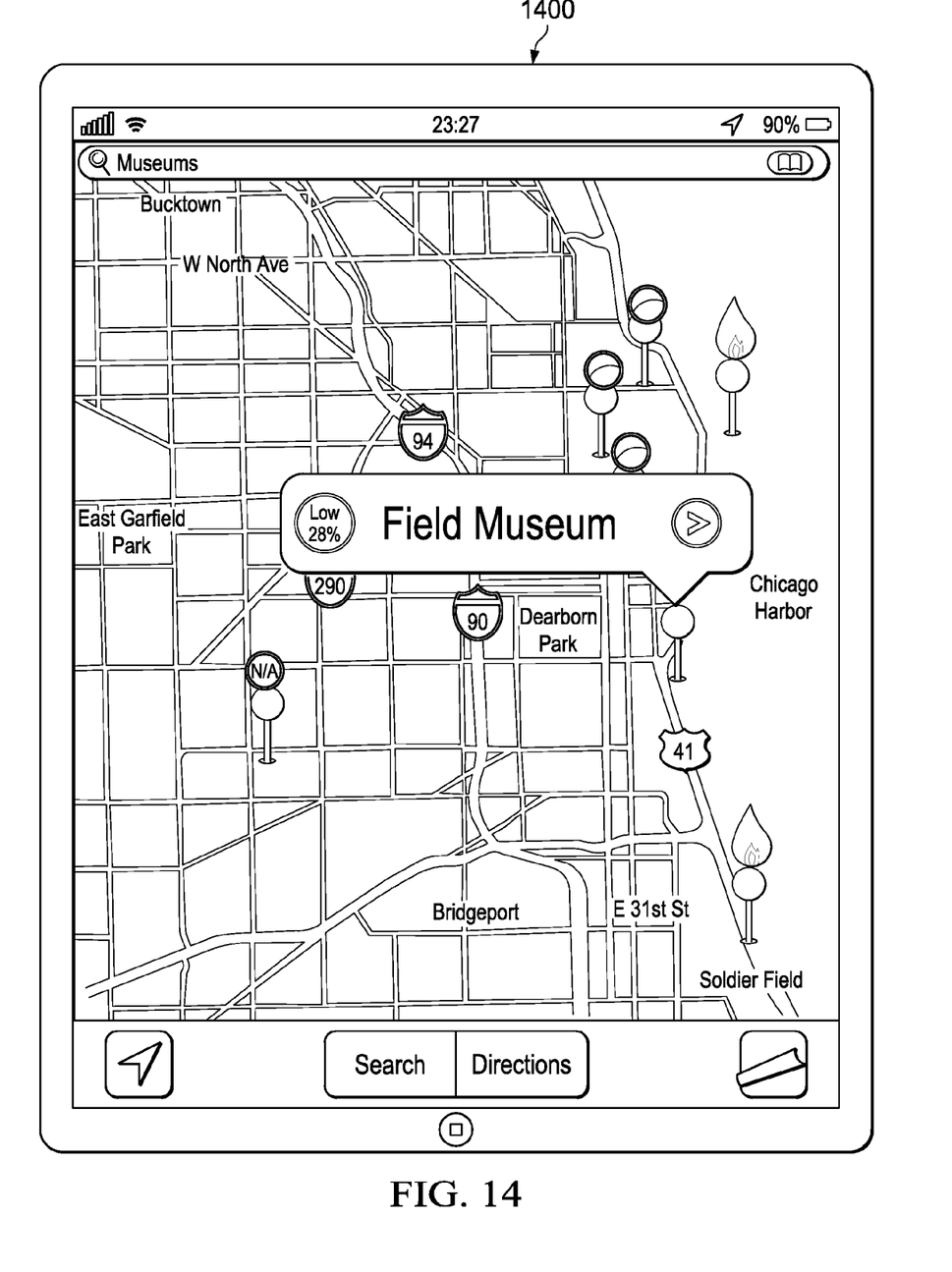
FIG. 14 is a screenshot of graphical interface presented to a mobile consumer perspective according to some embodiments.

FIG. 14 is a screenshot of graphical interface presented to a mobile consumer perspective. In some embodiments, screenshot 1400 may be displayed by a smart phone or other mobile device operated by a consumer (e.g., 105). Briefly, screenshot 1400 shows a map that is queried, for example, based upon the consumer's current location. The map shows the location of all of the venues in the area that are of interest. If there is data for the venue, then the user interface may output a relative value of the attendance forecast. For example, if the data is unavailable the location pushpin may reveal a "N/A" type indicator, but if the location is busy there may be a flame type indicator above the pushpin. There may also be intermediate representations between busy and N/A, such as the example of a 28% of maximum attendance indicator.

Another embodiment of a map queried may show icons on a map (pushpins as referred to above) that display a color scheme representing the relative levels of "busyness" for a venue. For sake of illustration, using the convention of "least", "light", "active", "heavy", and "most", the colors may be, respectively, light blue, blue, green, orange, and red. If a business is closed, the color of the map icon may be grey, for example.

In some embodiments, such a mobile interface may also show marketing incentives to be claimed along with other information about the establishment being queried. There may be graphical and statistical outputs of the attendance level, and the time frame for the query may be adjusted. Real-time comments from social network may also be displayed. Moreover, the mobile interface may have the ability to provide real-time data via the check-in and status update features to the location to provide real-time data, as well as query a map of the surrounding area.

Figure 15:
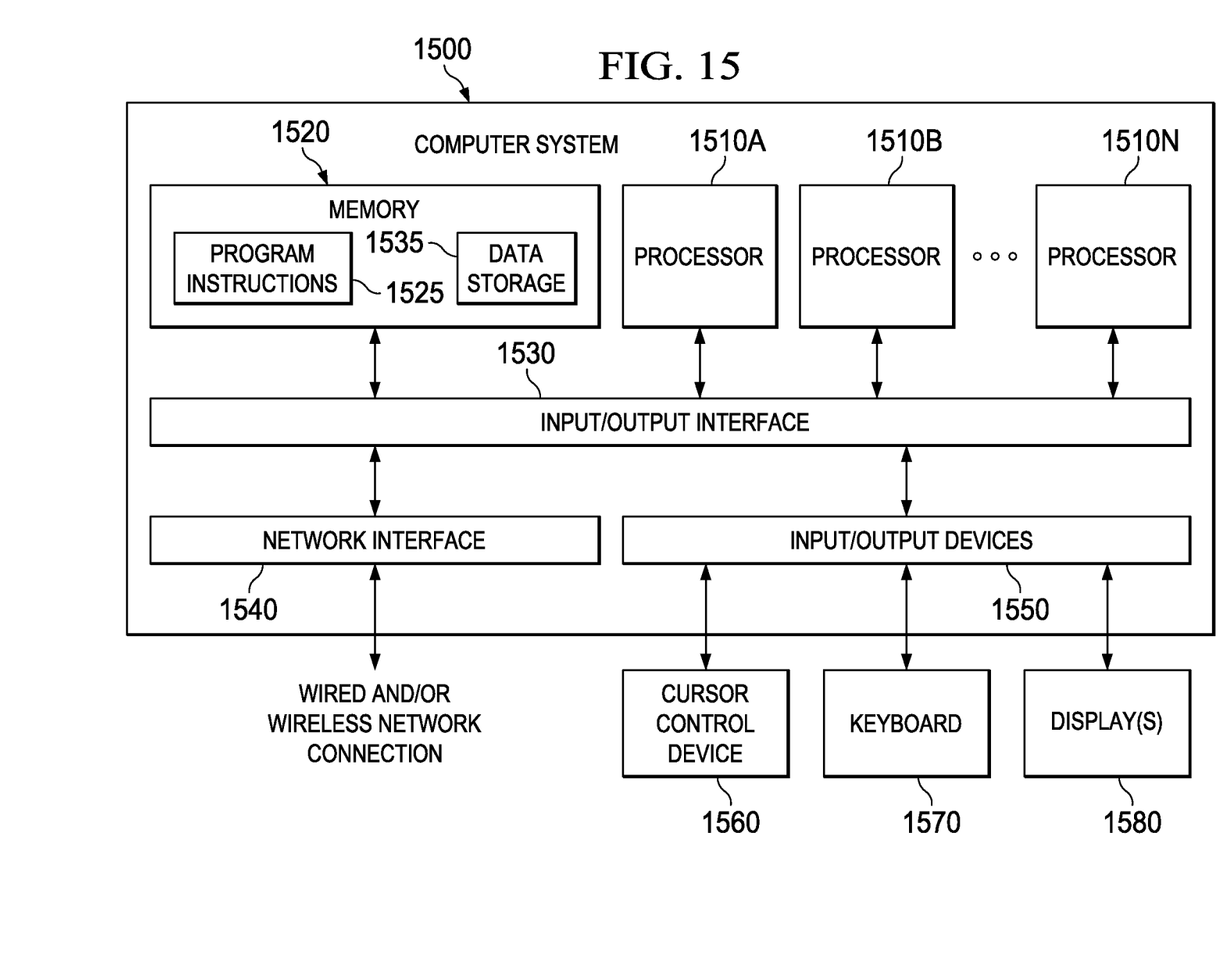
FIG. 15 is a block diagram of a computer system configured to implement various systems and methods described herein according to some embodiments.

Embodiments of systems for crowd prediction and attendance forecasting may be implemented or executed by one or more computer systems. One such computer system is illustrated in FIG. 15. In various embodiments, computer system 1500 may be a server, a mainframe computer system, a workstation, a network computer, a desktop computer, a laptop, a tablet computer, a mobile device, a smart phone, or the like. For example, in some cases, prediction system 100, consumers 105, businesses 110, and/or data sources 120 shown in FIG. 1 may be implemented as, or otherwise include one or more of, computer system 1500. As explained above, in different embodiments these various computer systems may be configured to communicate with each other in any suitable way, such as, for example, via network 130.

As illustrated, computer system 1500 includes one or more processors 1510 coupled to a system memory 1520 via an input/output (I/O) interface 1530. Computer system 1500 further includes a network interface 1540 coupled to I/O interface 1530, and one or more input/output devices 1550, such as cursor control device 1560, keyboard 1570, and display(s) 1580. In some embodiments, a given entity (e.g., prediction system 100) may be implemented using a single instance of computer system 1500, while in other embodiments multiple such systems, or multiple nodes making up computer system 1500, may be configured to host different portions or instances of embodiments. For example, in an embodiment some elements may be implemented via one or more nodes of computer system 1500 that are distinct from those nodes implementing other elements (e.g., a first computer system may implement attendance prediction engine 205 while another computer system may implement or manage databases 215 and/or 220).

In various embodiments, computer system 1500 may be a single-processor system including one processor 1510, or a multi-processor system including two or more processors 1510 (e.g., two, four, eight, or another suitable number). Processors 1510 may be any processor capable of executing program instructions. For example, in various embodiments, processors 1510 may be general-purpose or embedded processors implementing any of a variety of instruction set architectures (ISAs), such as the x86, POWERPC®, ARM®, SPARC®, or MIPS® ISAs, or any other suitable ISA. In multi-processor systems, each of processors 1510 may commonly, but not necessarily, implement the same ISA. Also, in some embodiments, at least one processor 1510 may be a graphics-processing unit (GPU) or other dedicated graphics-rendering device.

System memory 1520 may be configured to store program instructions and/or data accessible by processor 1510. In various embodiments, system memory 1520 may be implemented using any suitable memory technology, such as static random access memory (SRAM), synchronous dynamic RAM (SDRAM), nonvolatile/Flash-type memory, or any other type of memory. As illustrated, program instructions and data implementing certain operations, such as, for example, those described herein, may be stored within system memory 1520 as program instructions 1525 and data storage 1535, respectively. In other embodiments, program instructions and/or data may be received, sent or stored upon different types of computer-accessible media or on similar media separate from system memory 1520 or computer system 1500. Generally speaking, a computer-accessible medium may include any tangible storage media or memory media such as magnetic or optical media—e.g., disk or CD/DVD-ROM coupled to computer system 1500 via I/O interface 1530. Program instructions and data stored on a tangible computer-accessible medium in non-transitory form may further be transmitted by transmission media or signals such as electrical, electromagnetic, or digital signals, which may be conveyed via a communication medium such as a network and/or a wireless link, such as may be implemented via network interface 1540.

In an embodiment, I/O interface 1530 may be configured to coordinate I/O traffic between processor 1510, system memory 1520, and any peripheral devices in the device, including network interface 1540 or other peripheral interfaces, such as input/output devices 1550. In some embodiments, I/O interface 1530 may perform any necessary protocol, timing or other data transformations to convert data signals from one component (e.g., system memory 1520) into a format suitable for use by another component (e.g., processor 1510). In some embodiments, I/O interface 1530 may include support for devices attached through various types of peripheral buses, such as a variant of the Peripheral Component Interconnect (PCI) bus standard or the Universal Serial Bus (USB) standard, for example. In some embodiments, the function of I/O interface 1530 may be split into two or more separate components, such as a north bridge and a south bridge, for example. In addition, in some embodiments some or all of the functionality of I/O interface 1530, such as an interface to system memory 1520, may be incorporated directly into processor 1510.

Network interface 1540 may be configured to allow data to be exchanged between computer system 1500 and other devices attached to network 115, such as other computer systems, or between nodes of computer system 1500. In various embodiments, network interface 1540 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

Input/output devices 1550 may, in some embodiments, include one or more display terminals, keyboards, keypads, touch screens, scanning devices, voice or optical recognition devices, or any other devices suitable for entering or retrieving data by one or more computer system 1500. Multiple input/output devices 1550 may be present in computer system 1500 or may be distributed on various nodes of computer system 1500. In some embodiments, similar input/output devices may be separate from computer system 1500 and may interact with one or more nodes of computer system 1500 through a wired or wireless connection, such as over network interface 1540.

As shown in FIG. 15, memory 1520 may include program instructions 1525, configured to implement certain embodiments described herein, and data storage 1535, comprising various data accessible by program instructions 1525. In an embodiment, program instructions 1525 may include software elements of embodiments illustrated in FIG. 2. For example, program instructions 1525 may be implemented in various embodiments using any desired programming language, scripting language, or combination of programming languages and/or scripting languages (e.g., C, C++, C#, JAVA®, JAVASCRIPT®, PERL®, etc.). Data storage 1535 may include data that may be used in these embodiments. In other embodiments, other or different software elements and data may be included.

A person of ordinary skill in the art will appreciate that computer system 1500 is merely illustrative and is not intended to limit the scope of the disclosure described herein. In particular, the computer system and devices may include any combination of hardware or software that can perform the indicated operations. In addition, the operations performed by the illustrated components may, in some embodiments, be performed by fewer components or distributed across additional components. Similarly, in other embodiments, the operations of some of the illustrated components may not be performed and/or other additional operations may be available. Accordingly, systems and methods described herein may be implemented or executed with other computer system configurations.

The various techniques described herein may be implemented in software, hardware, or a combination thereof. The order in which each operation of a given method is performed may be changed, and various elements of the systems illustrated herein may be added, reordered, combined, omitted, modified, etc. Various modifications and changes may be made as would be clear to a person of ordinary skill in the art having the benefit of this specification. It is intended that the invention(s) described herein embrace all such modifications and changes and, accordingly, the above description should be regarded in an illustrative rather than a restrictive sense.

The invention claimed is:

1. A method, comprising:
   performing, by one or more computer systems,
      generating an initial attendance forecast for a venue using a historical attendance prediction model and historical data;
      creating a dynamic attendance prediction model for the venue based, at least in part, upon the initial attendance forecast and real-time data; and
      generating an updated attendance forecast for the venue using the dynamic attendance prediction model.

2. The method of claim 1, wherein the venue includes a retail store, a restaurant, a bar, a nightclub, a museum, a theater, a stadium, an airport, a hotel, or a park.

3. The method of claim 1, wherein the historical data includes historical point-of-sale (POS) data originated by the venue, the historical POS data including a plurality of transactions that took place prior to the initial attendance forecast having been generated.

4. The method of claim 1, wherein the historical data includes external data not originated by the venue, the external data including one or more of: weather data, geo-position data, satellite image data, or automobile traffic data.

5. The method of claim 1, wherein the real-time data includes real-time point-of-sale (POS) data originated by the venue, the real-time POS data related to one or more transactions taking place after the initial attendance forecast is generated.

6. The method of claim 5, further comprising:
   performing, by the one or more computer systems,
      receiving the real-time POS data after the venue records each of the one or more transactions.

7. The method of claim 5, further comprising:
   performing, by the one or more computer systems,
      receiving the real-time POS data after the venue records a pre-determined number of the one or more transactions.

8. The method of claim 5, further comprising:
   performing, by the one or more computer systems,
      receiving the real-time POS data at pre-determined times or time intervals.

9. The method of claim 1, wherein the real-time data includes one or more of the venue's: utility usage data, employee attendance data, audio or visual equipment usage data, number of detected internet-enabled devices, reservation data, arrivals data, or departures data.

10. The method of claim 1, wherein the real-time data includes check-in or status update data gathered from one or more social networks over the Internet.

11. A tangible electronic storage medium having program instructions stored thereon that, upon execution by a processor within an attendance prediction system, cause the attendance prediction system to:
   receive historical point-of-sale (POS) data generated by a venue;
   select one of a plurality of historical attendance prediction models;
   generate an initial attendance forecast for the venue based, at least in part, upon the historical POS data and the selected historical attendance prediction model;
   receive updated POS data generated by the venue;
   create a dynamic attendance prediction model for the venue based, at least in part, upon the updated POS data and the initial attendance forecast; and
   generate an updated attendance forecast for the venue based, at least in part, upon the dynamic attendance prediction model.

12. The tangible electronic storage medium of claim 11, wherein the selected one of the plurality of historical attendance prediction models yields an error based on a comparison between predicted and actual historical attendance data that is smaller than another error yielded by another of the plurality of historical attendance prediction models.

13. The tangible electronic storage medium of claim 11, wherein the program instructions, upon execution, further cause the attendance prediction system to:

receive additional historical data generated by one or more entities other than the venue, the additional historical data including at least one of: weather data, geo-position data, satellite image data, or automobile traffic data; and
generate the initial attendance forecast for the venue based, at least in part, upon the additional historical data.

14. The tangible electronic storage medium of claim 11, wherein the program instructions, upon execution, further cause the attendance prediction system to:
receive additional data generated by one or more entities other than the venue, the additional data including check-in or status update data gathered from one or more social networks over the Internet; and
generate the updated attendance forecast for the venue based, at least in part, upon the additional data.

15. The tangible electronic storage medium of claim 11, wherein the program instructions, upon execution, further cause the attendance prediction system to:
receive additional data including utility at least one of: utility usage data, employee attendance data, audio or visual equipment usage data, number of detected internet-enabled devices, reservation data, arrivals data, or departures data; and
generate the updated attendance forecast for the venue based, at least in part, upon the additional data.

16. The tangible electronic storage medium of claim 11, wherein to create the dynamic attendance prediction model, the program instructions, upon execution, further cause the attendance prediction system to:
calculate a first set of one or more weights corresponding to the historical POS data and a second set or one or more weights corresponding to the updated POS data.

17. A computer system, comprising:
a processor; and
a memory coupled to the processor, the memory configured to store program instructions executable by the processor to cause the computer system to:
provide a venue's historical attendance data to an attendance prediction system remotely located with respect to the computing system, the attendance prediction system configured to generate an initial attendance forecast for the venue using a historical attendance prediction model and the historical attendance data;
provide the venue's real-time attendance data to the attendance prediction system, the attendance prediction system further configured to create a dynamic attendance prediction model for the venue based, at least in part, upon the initial attendance forecast and the real-time attendance data; and
receive, from the attendance prediction system, an updated attendance forecast for the venue based on the dynamic attendance prediction model.

18. The computer system of claim 17, wherein the historical attendance data includes historical point-of-sale (POS) data generated by the venue's POS system, the historical POS data corresponding to a plurality of transactions that took place prior to the initial attendance forecast having been generated, and each of the plurality of transactions including a time and an amount.

19. The computer system of claim 17, wherein the real-time attendance data includes real-time point-of-sale (POS) data generated by the venue's POS system, the real-time POS data corresponding to one or more transactions taking place after the initial attendance forecast is generated, and each of the one or more transactions including a time and an amount.

20. The computer system of claim 17, wherein the real-time attendance data includes one or more of the venue's: utility usage data, employee attendance data, audio or visual equipment usage data, number of detected internet-enabled devices, reservation data, arrivals data, or departures data.

* * * * *